United States Patent
Manske et al.

(10) Patent No.: US 10,740,357 B2
(45) Date of Patent: Aug. 11, 2020

(54) GENERATION AND HANDLING OF SITUATION OBJECTS

(71) Applicant: SAP SE, Walldorf (DE)

(72) Inventors: Knut Manske, Oftersheim (DE);
Gregor Tielsch, Mannheim (DE);
Maricel Cabahug, Palo Alto, CA (US);
Thomas Reiss, Heidelberg (DE);
Alexander Lingg, Heidelberg (DE);
Kai Richter, Muehltal (DE)

(73) Assignee: SAP SE, Walldorf (DE)

( * ) Notice: Subject to any disclaimer, the term of this patent is extended or adjusted under 35 U.S.C. 154(b) by 388 days.

(21) Appl. No.: 14/975,051

(22) Filed: Dec. 18, 2015

(65) Prior Publication Data

US 2017/0177702 A1    Jun. 22, 2017

(51) Int. Cl.
| | |
|---|---|
| *G06F 7/00* | (2006.01) |
| *G06F 16/28* | (2019.01) |
| *G06F 16/2457* | (2019.01) |
| *G06F 16/26* | (2019.01) |

(52) U.S. Cl.
CPC ...... *G06F 16/284* (2019.01); *G06F 16/24575* (2019.01); *G06F 16/24578* (2019.01); *G06F 16/26* (2019.01)

(58) Field of Classification Search
CPC ...................................... G06F 16/26
USPC ...................................... 707/756
See application file for complete search history.

(56) References Cited

U.S. PATENT DOCUMENTS

| | | | |
|---|---|---|---|
| 5,736,985 A | 4/1998 | Lection | |
| 5,754,176 A | 5/1998 | Crawford | |
| 6,775,658 B1 | 8/2004 | Zothner | |
| 7,124,031 B1 * | 10/2006 | Hoffman | G06Q 50/22 |
| | | | 702/19 |
| 7,181,694 B2 | 2/2007 | Reiss et al. | |
| 7,424,602 B2 | 9/2008 | Reiss et al. | |
| 8,131,668 B2 | 3/2012 | Beringer et al. | |
| 8,312,416 B2 | 11/2012 | Freund et al. | |
| 8,401,928 B2 | 3/2013 | Herrmann et al. | |
| 8,712,953 B2 | 4/2014 | Beringer et al. | |
| 8,782,530 B2 | 7/2014 | Beringer et al. | |
| 8,938,053 B2 | 1/2015 | Cooke et al. | |
| 9,411,856 B1 * | 8/2016 | Stevens | G06F 16/2457 |
| 9,535,902 B1 * | 1/2017 | Michalak | G06F 40/284 |

(Continued)

OTHER PUBLICATIONS

U.S. Office Action (Non-final) in U.S. Appl. No. 14/974,817, dated Sep. 14, 2018, 29 pages.

(Continued)

*Primary Examiner* — Eliyah S. Harper
(74) *Attorney, Agent, or Firm* — Fish & Richardson P.C.

(57) ABSTRACT

Techniques for identifying a knowledge graph including one or more objects; generating a situation definition based on the knowledge graph, the generating including: identifying a particular object of the one or more objects; determining a trigger condition associated with the particular object; determining related information based on the one or more objects; determining one or more actions associated with the one or more objects and based on: i) the trigger condition, and ii) the related information; associating the trigger, the related information, and the one or more actions with the situation definition; and associating the situation definition with criteria for assignment to one or more user profiles.

20 Claims, 12 Drawing Sheets

(56) References Cited

U.S. PATENT DOCUMENTS

| | | |
|---|---|---|
| 9,569,260 B2 | 2/2017 | Caligo |
| 2005/0160065 A1* | 7/2005 | Seeman ................ G09B 21/007 |
| 2007/0216535 A1* | 9/2007 | Carrino ................. G06Q 10/10 |
| | | 340/573.1 |
| 2009/0070165 A1 | 3/2009 | Baeuerle |
| 2011/0022662 A1 | 1/2011 | Barber-Mingo |
| 2012/0173384 A1 | 7/2012 | Herrmann et al. |
| 2013/0054509 A1 | 2/2013 | Kass et al. |
| 2013/0111357 A1 | 5/2013 | McCormack |
| 2013/0132351 A1 | 5/2013 | Richter |
| 2014/0068510 A1 | 3/2014 | Richeter et al. |
| 2014/0149384 A1* | 5/2014 | Krishna ................ G06F 16/437 |
| | | 707/711 |
| 2015/0186531 A1* | 7/2015 | Agarwal ............. G06F 3/04842 |
| | | 707/722 |
| 2015/0186532 A1* | 7/2015 | Agarwal ............. G06F 16/9535 |
| | | 707/722 |
| 2015/0220580 A1* | 8/2015 | Pitsos ..................... G06F 40/30 |
| | | 707/690 |
| 2017/0178000 A1 | 6/2017 | Manske et al. |

OTHER PUBLICATIONS

Final Office Action issued in U.S. Appl. No. 14/974,817 dated Apr. 5, 2019, 26 pages.
Non-Final office action issued in U.S. Appl. No. 14/974,817 dated Nov. 4, 2019, 15 pages.

* cited by examiner

GENERATION AND HANDLING OF SITUATION OBJECTS

CROSS-REFERENCE TO RELATED APPLICATION

This application is a co-pending application of U.S. application Ser. No. 14/974,817, filed on Dec. 18, 2015 entitled GENERATION AND HANDLING OF SITUATION OBJECTS; the entire contents of which is incorporated herein by reference.

TECHNICAL BACKGROUND

This disclosure relates to generating and handling of situation definitions with respect to a knowledge graph, e.g., a graph of associated objects.

BACKGROUND

Today, users recognize business situations through business routines, i.e., by looking up critical business objects regularly. Related information is then looked up in a variety of locations, reports, applications, lists, etc., provided that the user knows where information is located. Additionally, the user, having prior knowledge of actions, selects options in the system or by entering the information in appropriate fields for such actions.

SUMMARY

The present disclosure relates to computer-implemented methods, software, and systems for generating situation definitions. In some implementations, a knowledge graph is identified including one or more business objects. A situation definition is generated based on the knowledge graph. A particular business object of the one or more business objects is identified. A trigger condition associated with the particular business object is determined. Related information based on the one or more business objects is determined. One or more actions associated with the one or more business objects is determined and based on i) the trigger condition, and ii) the related information. The trigger condition, the related information, and the one or more actions are associated with the situation definition. The situation definition is associated with criteria for assignment to one or more user profiles.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general implementations, determining a relevance level associated with the situation definition, the relevance level indicating a timing associated with a notification of the situation definition to a user associated with one of the user profiles.

In a second aspect combinable with any of the previous aspects, selecting at least one business object of the one or more business objects, and determining the related information based on the selected at least one business object.

In a third aspect combinable with any of the previous aspects, identifying one or more annotations associated with the one or more business objects.

In a fourth aspect combinable with any of the previous aspects, based on the identified annotations, identifying a plurality of actions associated with each business object of the one or more business objects; and selecting a subset of the plurality of actions as the determined one or more actions.

In a fifth aspect combinable with any of the previous aspects, receiving a user input indicating the subset of the plurality of actions.

In a sixth aspect combinable with any of the previous aspects, determining a frequency of evaluation of the trigger condition.

In a seventh aspect combinable with any of the previous aspects, updating a previously-generated situation definition.

In an eighth aspect combinable with any of the previous aspects, determining one or more criteria for assignment of the situation definition to the one or more user profiles.

Various implementations of a computing system according to the present disclosure may have one or more of the following features. For example, capture of business situations with business context and user context. The situation definition adds meaning to data by i) captured application knowledge, ii) business knowhow (domain and customer) in triggering conditions, and ii) individual expert knowledge by considering user behavior. Other feature include consistent handling of situations across applications is provided; related information and actions for a business situation are provided in one place. Assignment of situation instances to individuals is based on user context. The user's choice to handle a business situation sets a clear context for the applications. Track handling of situations for improved recommendations and for analysis/auditing. A basis for advanced algorithms using advanced analytics, machine learning, or cognitive computing (e.g., systems that learn from expert behavior). Other features will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Figure 1:
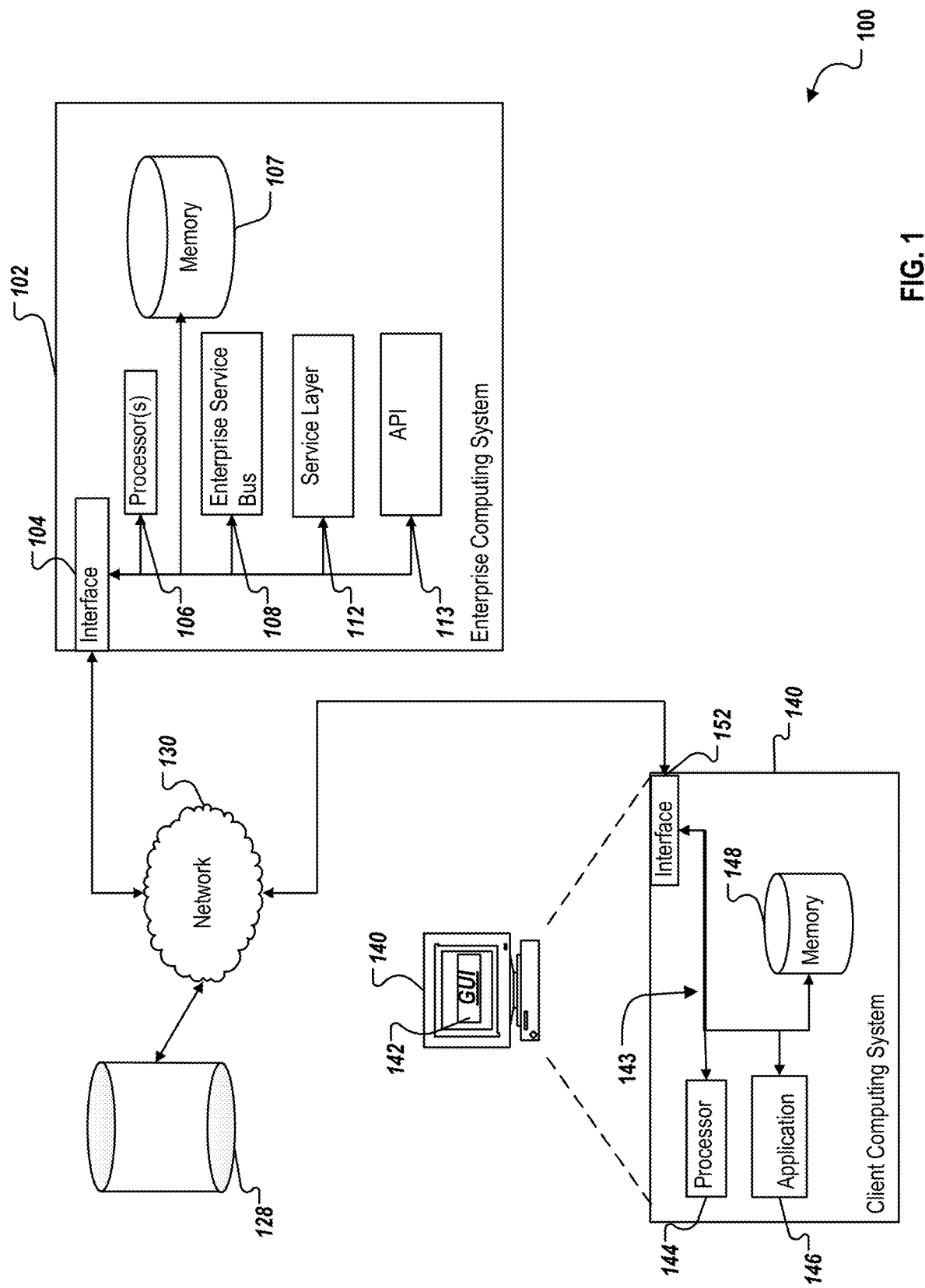
FIG. 1 illustrates an example distributed computing system for generating and handling situation definitions, according to an implementation.

FIG. 1 illustrates an example distributed computing system 100, according to an implementation. The illustrated example distributed computing system 100 includes an enterprise computing system 102, a client computing system 140, and an in-memory repository 128 communicating using a network 130. In some examples, the illustrated enterprise server computing system 102 may store a plurality of various hosted applications, while in some examples, the enterprise server computing system 102 may be a dedicated server meant to store and execute only a single hosted application. In some instances, the enterprise server computing system 102 may comprise a web server, where the hosted applications represent one or more web-based applications accessed and executed using the network 130 by the client computing system 140 to perform the programmed tasks or operations of the hosted application.

At a high level, the illustrated enterprise server computing system 102 comprises an electronic computing device operable to receive, transmit, process, store, or manage data and information associated with the distributed computing system 100. Specifically, the enterprise server computing system 102 illustrated in FIG. 1 is responsible for receiving application requests from one or more client applications associated with the client computing system 140 of the distributed computing system 100 and responding to the received requests by processing said requests in the associated hosted application, and sending the appropriate response from the hosted application back to the requesting client application. In addition to requests from the client computing system 140 illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device, components of which communicate using a computing system bus. For example, although FIG. 1 illustrates a single enterprise server computing system 102, the distributed computing system 100 can be implemented using two or more servers, as well as computers other than servers, including a server pool. In some examples, the enterprise server computing system 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the enterprise server computing system 102 may be adapted to execute any operating system, including Linux, UNIX, Windows, Mac OS, or any other suitable operating system.

The illustrated enterprise server computing system 102 further includes an interface 104. Although illustrated as a single interface 104 in FIG. 1, two or more interfaces 104 may be used according to particular needs, desires, or particular implementations of the example distributed computing system 100. The interface 104 is used by the enterprise server computing system 102 for communicating with other systems in a distributed environment—including within the example distributed computing system 100—connected to the network 130; for example, the client computing system 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, ABAP, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The illustrated enterprise server computing system 102 further includes a processor 106. Although illustrated as a single processor 106 in FIG. 1, two or more processors may be used according to particular needs, desires, or particular implementations of the example distributed computing system 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the enterprise server computing system 102. Specifically, the processor 106 executes the functionality required to receive and respond to requests from the client computing system 140.

The illustrated enterprise server computing system 102 also includes a memory 107. Although illustrated as a single memory 107 in FIG. 1, two or more memories may be used according to particular needs, desires, or particular implementations of the example distributed computing system 100. In some implementations, the memory 107 is an in-memory database. While memory 107 is illustrated as an integral component of the enterprise server computing system 102, in some implementations, the memory 107 can be external to the enterprise server computing system 102 and/or the example distributed computing system 100. The memory 107 may include any memory or database module and may take the form of volatile or non-volatile memory including, without limitation, magnetic media, optical media, random access memory (RAM), read-only memory (ROM), removable media, or any other suitable local or remote memory component. The memory 107 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise computing system 102. Additionally, the memory 107 may include any other appropriate data, such as VPN applications, firmware logs and policies, firewall policies, a security or access log, print or other reporting files, as well as others.

The illustrated enterprise server computing system 102 further includes a service layer 112. The service layer 112 provides software services to the example distributed computing system 100. The functionality of the enterprise server computing system 102 may be accessible for all service consumers using this service layer. Software services provide reusable, defined business functionalities through a defined interface. For example, the interface may be software written in extensible markup language (XML) or other suitable language. While illustrated as an integrated component of the enterprise server computing system 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The illustrated enterprise server computing system 102 further includes an application programming interface (API) 113. In some implementations, the API 113 can be used to interface between one or more components of the enterprise server computing system 102 or other components of the example distributed computing system 100, both hardware and software. The API 113 may include specifications for routines, data structures, and object classes. The API 113 may be either computer language independent or dependent and refer to a complete interface, a single function, or even a set of APIs. While illustrated as an integrated component of the enterprise server computing system 102 in the example distributed computing system 100, alternative implementations may illustrate the API 113 as a stand-alone component in relation to other components of the example distributed computing system 100. Moreover, any or all parts of the API 113 may be implemented as child or sub-modules of another software module, enterprise application, or hardware module without departing from the scope of this disclosure.

The client computing system 140 may be any computing device operable to connect to or communicate with at least the enterprise server computing system 102 using the network 130. In general, the client computing system 140 comprises a computer operable to receive, transmit, process, and store any appropriate data associated with the example distributed computing system 100. The illustrated client computing system 140 further includes an application 146. The application 146 is any type of application that allows the client computing system 140 to request and view content on the client computing system 140. In some implementations, the application 146 can be and/or include a web browser. In some implementations, the application 146 can use parameters, metadata, and other information received at launch to access a particular set of data from the enterprise server computing system 102. Once a particular application 146 is launched, a user may interactively process a task, event, or other information associated with the enterprise server computing system 102. Further, although illustrated as a single application 146, the application 146 may be implemented as multiple applications in the client computing system 140.

The illustrated client computing system 140 further includes an interface 152, a processor 144, and a memory 148 communicating over a computing system bus 143. The interface 152 is used by the client computing system 140 for communicating with other systems in a distributed environment—including within the example distributed computing system 100—connected to the network 130; for example, the enterprise server computing system 102 as well as other systems communicably coupled to the network 130 (not illustrated). The interface 152 may also be consistent with the above-described interface 104 of the enterprise server computing system 102 or other interfaces within the example distributed computing system 100.

The processor 144 may be consistent with the above-described processor 106 of the enterprise server computing system 102 or other processors within the example distributed computing system 100. Specifically, the processor 144 executes instructions and manipulates data to perform the operations of the client computing system 140, including the functionality required to send requests to the enterprise server computing system 102 and to receive and process responses from the enterprise server computing system 102. The memory 148 may be consistent with the above-described memory 107 of the enterprise server computing system 102 or other memories within the example distributed computing system 100 but storing objects and/or data associated with the purposes of the client computing system 140.

Further, the illustrated client computing system 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the enterprise server computing system 102. Generally, through the GUI 142, an enterprise server computing system 102 user is provided with an efficient and user-friendly presentation of data provided by or communicated within the example distributed computing system 100.

There may be any number of client computing systems 140 associated with, or external to, the example distributed computing system 100. For example, while the illustrated example distributed computing system 100 includes one client computing system 140 communicably coupled to the enterprise server computing system 102 using network 130, alternative implementations of the example distributed computing system 100 may include any number of client computing systems 140 suitable for the purposes of the example distributed computing system 100. Additionally, there may also be one or more client computing systems 140 external to the illustrated portion of the example distributed computing system 100 that are capable of interacting with the example distributed computing system 100 using the network 130. Moreover, while the client computing system 140 is described in terms of being used by a single user, this disclosure contemplates that many users may use one computer, or that one user may use multiple computers.

The illustrated client computing system 140 is intended to encompass any computing device such as a desktop computer, laptop/notebook computer, wireless data port, smart phone, smart watch, wearable computing device, personal data assistant (PDA), tablet computing device, one or more processors within these devices, or any other suitable processing device. For example, the client computing system 140 may comprise a computer that includes an input device, such as a keypad, touch screen, or other device that can accept user information, and an output device that conveys information associated with the operation of the enterprise server computing system 102 or the client computing system 140 itself, including digital data, visual information, or a GUI 142, as shown with respect to the client computing system 140.

The illustrated distributed computing system 100 further includes a repository 128. In some implementations, the repository 128 is an in-memory repository. In some examples, the in-memory repository may include integrated processing. In some examples, the in-memory repository may reside on top of a computational engine that facilitates fast manipulations on large amounts of data and/or replication of data. The repository 128 can be a cloud-based storage medium. For example, the repository 128 can be networked online storage where data is stored on virtualized pools of storage.

With respect to the network 130, generally, the illustrated network 130 facilitates wireless or wireline communications between the components of the distributed computing system 100 (e.g., between the computing systems 102 and 140), as well as with any other local or remote computer, such as additional clients, servers, or other devices communicably coupled to network 130 but not illustrated in FIG. 1. The network 130 is illustrated as a single network in FIG. 1, but may be a continuous or discontinuous network without departing from the scope of this disclosure, so long as at least a portion of the network 130 may facilitate communications between senders and recipients. The network 130 may be all or a portion of an enterprise or secured network, while in another instance at least a portion of the network 130 may represent a connection to the Internet.

In some instances, a portion of the network 130 may be a virtual private network (VPN), such as, for example, the connection between the client computing system 140 and the enterprise server computing system 102. Further, all or a portion of the network 130 can comprise either a wireline or wireless link. Example wireless links may include 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated distributed computing system 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

Figure 2:
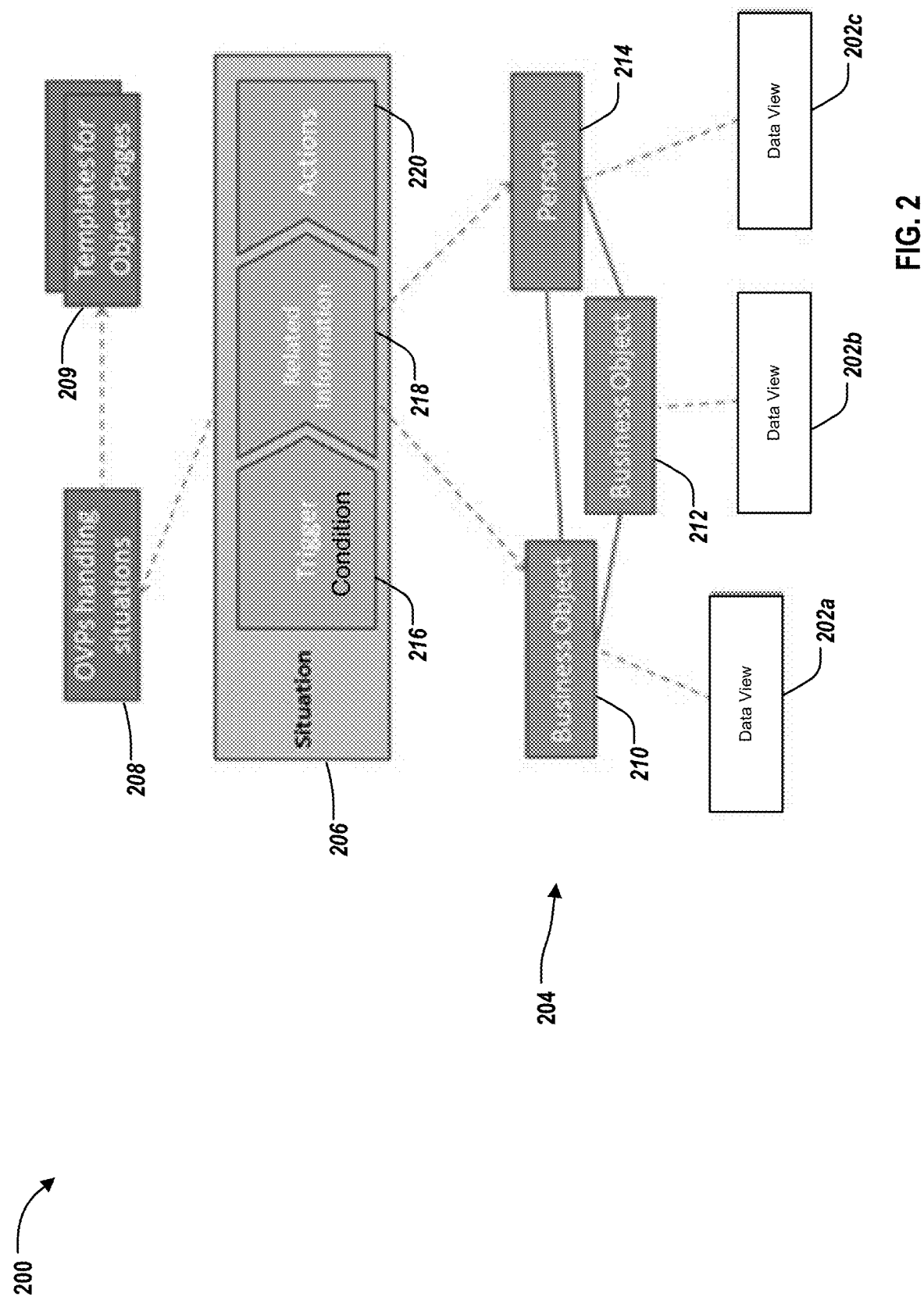
FIG. 2 illustrates a relationship graph associated with a situation definition, according to an implementation.

FIG. 2 illustrates a relationship graph 200 associated with a situation definition, according to an implementation. Specifically, in some examples, the graph 200 includes data views (with semantic metadata and association information) 202a, 202b, 202c (collectively referred to as data objects 202), a knowledge graph 204, a situation definition 206, an overview page 208 and templates 209 (or building blocks 209). The data views 202 contain (or refer to) lists of business object instances (e.g., stored in database tables and accessible through database views). The knowledge graph 204 (also referred to as a business fabric 204) includes business objects 210, 212 and a user profile object 214, and relationships between each of the business objects 210, 212 and the user profile object 214. The business objects 210, 212 and the user profile object 214 are associated with data views 202.

The data views 202 contain data that is associated with the business objects 210, 212 and the user profile object 214. In some examples, the data of the data views 202 include semantic metadata, for example, a name of the respective business object and attributes associated with the business objects 210, 212. Further, the data views 202 can include associations between the business objects 210, 212 and the user profile object 214. In some examples, the data views 202 contain data of all instances associated with the business objects 210, 212. In some examples, the data view 202 associated with the user profile object 214 includes user profile information associated with a user, including role status, and historical activity of the user with respect to applications associated with the business objects 210, 212.

In some implementations, the situation definition 206 is associated with the knowledge graph 204. Specifically, the situation definition 206 includes a trigger condition (trigger rule) 216, related information 218, and references to actions 220. In short, the situation definition 206 is associated with a business situation that requires action by one or more users associated with the situation definition 206. That is, when a condition defined by the trigger condition 216 is satisfied, the related information 218 and the actions 220 are identified based on the situation definition 206, and a situation instance of the situation definition 206 is created that can be presented to users with matching user profile information or with applications querying explicitly for certain situation instances. In some examples, the queries can include queries of business objects of a certain type with a related situation instance, queries of situation instances related a business domain or group of business objects, queries of situation instances of a particular type or types, and queries of business objects that may be of interested to a user, user group, and/or user role. In some examples, the overview page 208 presents the situation instances based on the situation definition 206. In some implementations, details of situation instances can be presented in situation specific object pages utilizing the template 209 (or building blocks 209). In some examples, the related information 218 includes IDs of related business object instances.

Figure 3:
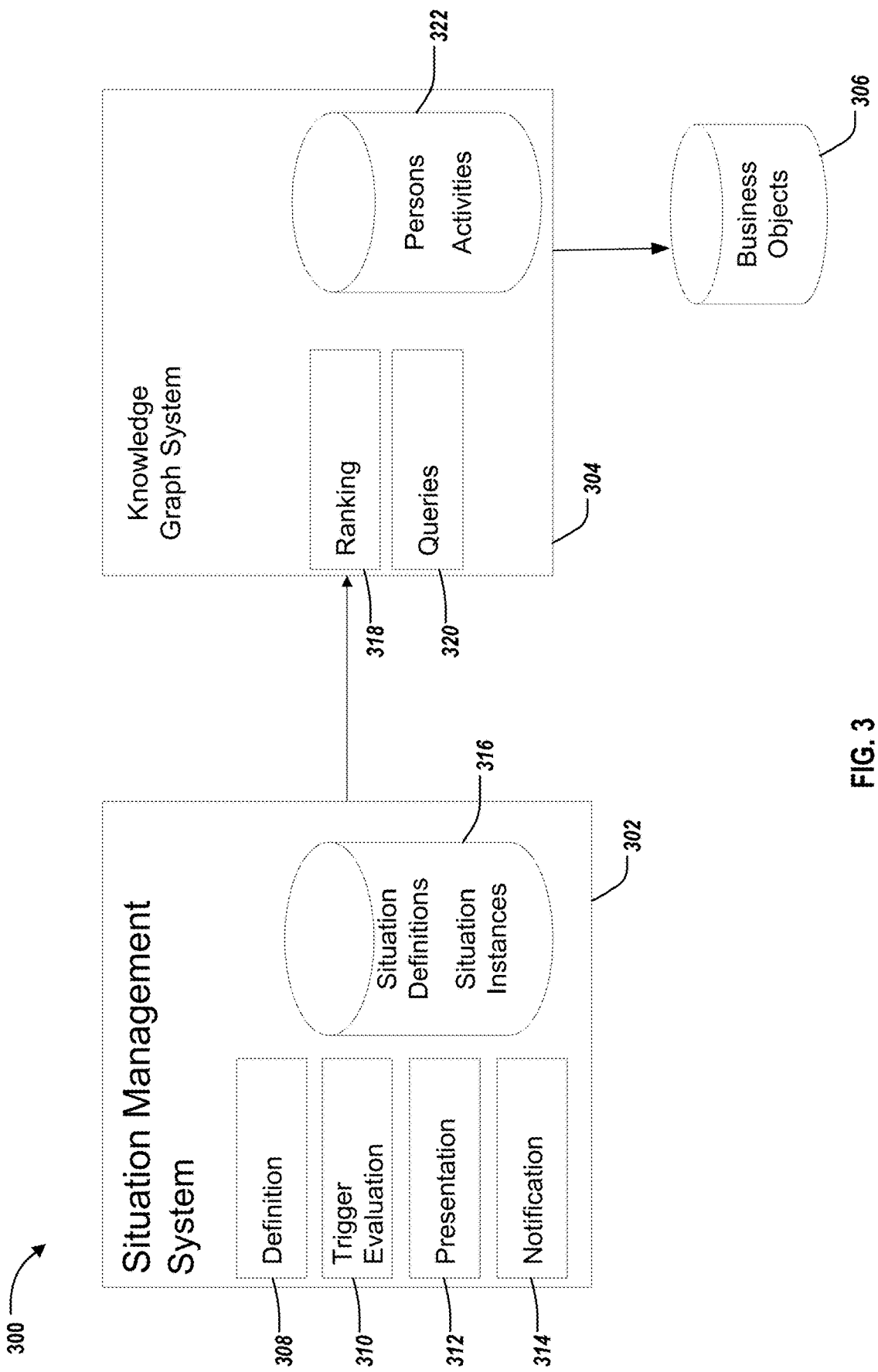
FIG. 3 illustrates an example system for determining a situation definition, according to an implementation.

FIG. 3 illustrates an example system 300 for determining a situation definition (e.g., the situation definition 206), and identifying a situation instance for presentation to a user, according to an implementation. System 300 includes a situation management system 302, a knowledge graph system 304, and a business object database 306. In some examples, the system 300 can be implemented by the enterprise computing system 102, the client computing system 140, or a combination thereof. For example, the situation management system 302 and the knowledge graph system 304 can be implemented by the enterprise computing system 102.

The situation management system 302 is in communication with the knowledge graph system 304 (e.g., over the network 130). The situation management system 302 includes a definition module 308, a trigger condition evaluation module 310, a presentation module 312, a notification module 314, and a situation data store 316. The definition module 308, the trigger condition evaluation module 310, the presentation module 312, the notification module 314, and the situation data store 316 can be in communication with one another. The knowledge graph system 304 is in communication with the business object database 306 and includes a ranking module 318, a query module 320, and a knowledge graph database 322. The business object database 306 includes business objects (e.g., the business objects 210, 212).

In short, the definition module 308 determines the situation definition (e.g., the situation definition 206), described further below, for storage by the situation data store 316. Determining the situation definition can include determining the trigger condition, related information, and actions associated with the situation definition based on the knowledge graph system 304 and the business object database 306. The trigger condition evaluation module 310 determines whether a trigger condition of a situation definition (as stored by the situation data store 316) is satisfied. In general, when the trigger condition is satisfied, the query module 320 queries the business objects of the business object database 306 to identify business objects associated with the situation definition of the satisfied trigger condition. For all identified business object instances (e.g., satisfying the trigger condition), a situation instance is stored in the situation data store 316 with reference to a situation definition and with reference to the associated business object instance (as stored by the business object database 306). In some examples, for business object instances in the situation data store 316 for which the trigger condition of the situation definition is not satisfied, the appropriate business object instances may be removed from the business object database 306 or marked as deleted depending on the specific implementation.

Further, in some implementations, for each user associated with the system 300, the presentation module 312 identifies situation instances stored by the situation data store 316 that can be associated with the user. In some examples, the situation instances are ranked by the ranking module 318 based on, among other criteria, relevance to the user and a business relevance. In some implementations, the notification module 314 can provide notification of a situation instance to the appropriate user(s) through one or more channels (e.g., push notification, SMS, email).

Figure 4:
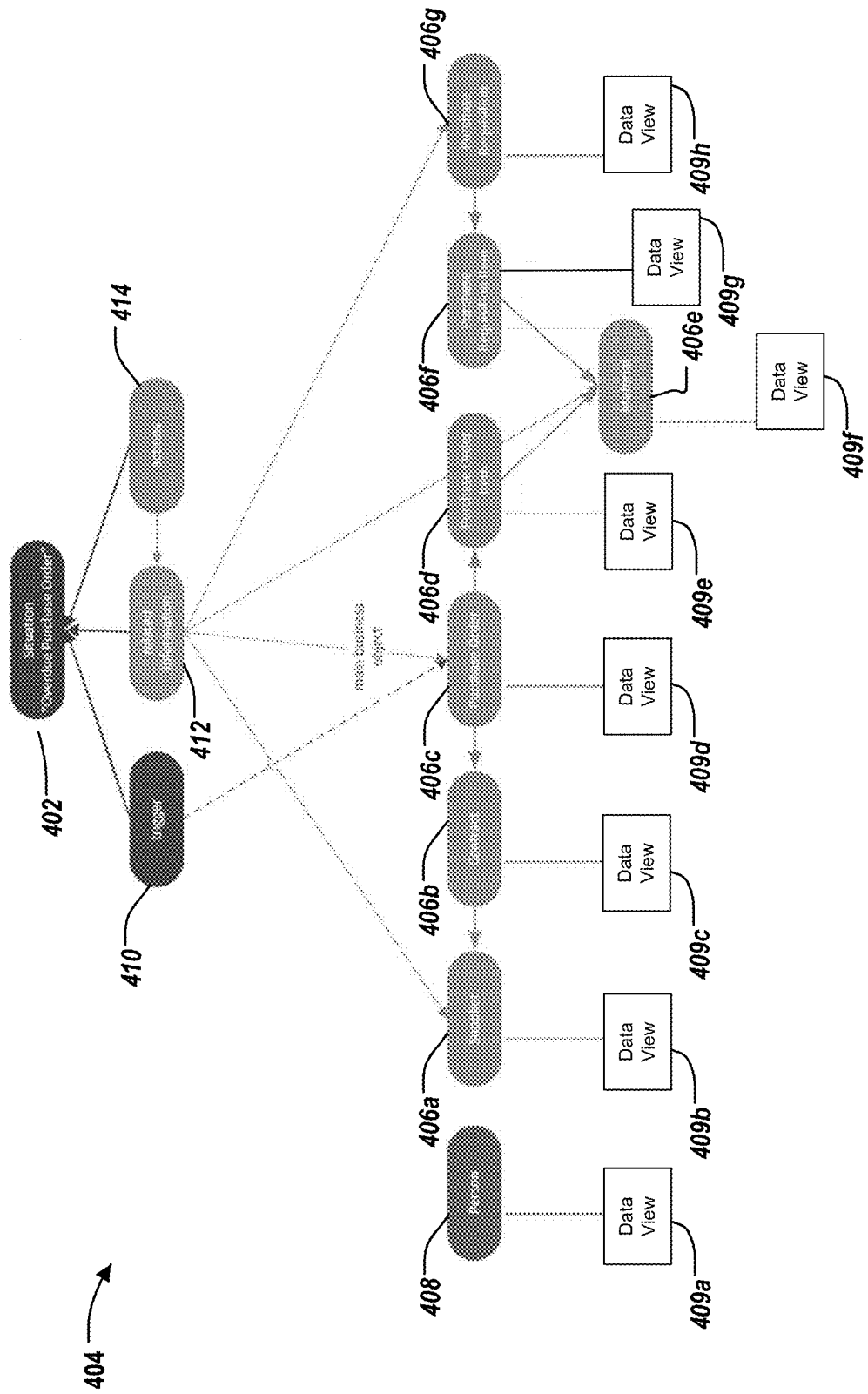
FIG. 4 illustrates an example of generating a situation definition, according to an implementation.

FIG. 4 illustrates an example of generating a situation definition 402, according to an implementation. Specifically, in some implementations, a knowledge graph 404 is identified that includes business objects 406. In the illustrated example, the knowledge graph 404 includes business objects 406a, 406b, 406c, 406d, 406e, 406f, 406g (collectively referred to as business objects 406). Additionally, the knowledge graph 404 includes a user profile object 408. The business objects 406 and the user profile object 408 can be similar to the business objects 210, 212 and the user profile object 214, respectively, as described above. The knowledge graph 404 further includes relationships between the business objects 406, and data views 409a-409h (collectively referred to as data views 409), similar to data views 202 described above.

In some implementations, the situation definition 402 is determined based on the knowledge graph 404. In some examples, the definition module 308 determines the situation definition 402 based on the knowledge graph 404, and particularly, on one or more business objects 406 of the knowledge graph 404. In the illustrated examples, the situation definition 402 is associated with a textual description of "Overdue Purchase Order." In some examples, the situation definition 402 is defined by the user, that is, the trigger condition, related information, and the actions are defined by the user. For example, the user defines the related information by selecting one or more of the business objects 406 or attributes of the one or more business objects 406 for association with the situation definition 402, described further below. In some examples, generating the situation definition 402 further includes defining the title, the textual description, and one or more business objects for association with the situation definition 402. In some examples, the textual description includes references (e.g., Uniform Resource Locators—URLs) to provide further information (e.g., compliance regulations, learning material, or process documentation).

In some implementations, generating the situation definition 402 includes identifying a particular (e.g., "main") business object of the business objects 406. In some examples, the user selects the particular business object. For example, a graphical representation of the business objects 406 can be provided to the user, e.g., using the GUI 142, where the user can select the particular business object using user input. In the illustrated example, the identified particular business object is the "purchase order" business object 406c.

In some implementations, generating the situation definition 402 includes determining a trigger condition associated with the particular business object (or in some examples, multiple business objects). In some examples, the trigger condition is specific to the particular business object, and is based upon the particular business object. In the illustrated example, the trigger condition 410 is determined, and based on the particular business object 406c. The trigger condition 410 can be based upon an age (e.g., a particular date) of a purchase order associated with the "purchase order" business object 406c. In some examples, the trigger condition 410 can be defined utilizing select statements in SQL, an in-memory database (HANA) Rules Framework (HRF), an analytical query modeler, business rules framework+ (BRF+), a Key Performance Indicator (KPI) definition, or any other framework for defining business rules.

In some examples, determining the trigger condition 410 for the particular business object 406c can include determining (or defining) a frequency of evaluation of the trigger condition 410, e.g., by the trigger condition evaluation module 310. The frequency of evaluation can be associated with the trigger condition 410, and provided by the user. In some examples, the trigger condition 410 is evaluated based on a schedule (e.g., weekly, daily, hourly). In some examples, the trigger condition 410 is evaluated when a particular business event or real-world event occurs, e.g., creation of a new purchase order, incoming call, or change of physical location. In some examples, a system for complex event processing may calculate such a particular business event out of a large volume of low level real-world events or low-level system events. In some examples, the trigger condition 410 is evaluated based on a user request.

In some implementations, generating the situation definition 402 includes determining related information 412 based on the business objects 406. In some examples, the user selects the business objects 406 that are appropriate for the situation definition 402. For example, a graphical representation of the business object 406 can be provided to the user, e.g., using the GUI 142, where the user can select the appropriate business objects 406. In the illustrated example, the selected business objects 406 for determining related information include business objects 406a, 406b, 406d, 406e, 406f, 406g.

In some examples, based on the selection of the appropriate business objects 406, the definition module 308 can assign the related information of the selected business objects 406 to the situation definition 402 as the related information 412. The related information can include data associated with the selected business objects 406, e.g., the data views 202. To that end, the definition module 308 can generate a predefined set of links based on the combination of the related information associated with the selected business objects 406 and the particular business object 406c. The definition module 308 can associate the predefined set of links with the situation definition 402.

In some examples, the user can search for specific business objects 406 (e.g., by providing a search query to a search system) for selecting the business objects 406 for determining related information. In some examples, the system 300 can recommend the appropriate business objects 406 for selection by the user. The system 300 can recommend the appropriate business objects 406 based on one or more queries of the business objects 406, annotations associated with business objects 406 (e.g., the data views 202), the relationships between the business objects 406, previously defined situation definitions (e.g., as stored by the situation data store 316), and relatedness of business objects 406 to the particular business object 406c. In some examples, the system 300 can recommend business objects 406 or attributes of the business objects 406 based on the evaluation of pre-existing situation definitions or based on the analysis of logged user activities by machine learning algorithms (e.g., cognitive algorithms, or other advanced algorithms).

In some implementations, generating the situation definition 402 includes determining actions 414 associated with the business objects 406 and based on the trigger condition 410 and the related information 412. In some examples, the definition module 308 identifies the actions associated with each of the selected business objects 406. That is, the related information (e.g., the data views 202) for each selected business objects 406 includes annotations associated with actions that are associated with the selected business object 406. In some examples, the user selects the actions that are appropriate for the situation definition 402. For example, a graphical representation of the actions can be provided to the user, e.g., using the GUI 142, where the user can select the actions that are appropriate for the situation definition 402. In the illustrated example, the actions associated with the business objects 406 are selected by the user, and are assigned to the situation definition 402 as the actions 414. Additionally, in some examples, the definition module 308 can identify the actions based on the trigger condition 410. That is, based on the triggering business event associated with the trigger condition 410, the particular business object 406c, or other criteria associated with the trigger condition 410. In some implementations, the actions 414 are recommended as a result of an analysis of logged user activities by machine learning algorithms.

In some examples, additional actions can be assigned to the situation definition 402 by the user that are not currently associated with the business objects 406 (e.g., associated with other portions of the system 300). In some examples, the additional actions can include "real-world" activities such as actions associated with SMS, URL sharing/linking, telephony, scheduling.

In some implementations, generating the situation definition 402 includes associating the trigger condition 410, the related information 412, and the actions 414 with the situation definition 402. In some examples, the definition module 308 associates the trigger condition 410, the related information 412, and the actions 414 with the situation definition 402. Associating the trigger condition 410, the related information 412, and the actions 414 with the situation definition 402 can include establishing a relationship between the trigger condition 410, the related information 412, and the actions 414 with the situation definition 402 in the knowledge graph 404.

In some implementations, the situation definition 402 is associated with the user profile 408. In some examples, the definition module 308 associates the situation definition 402 with the user profile 408. Specifically, the situation definition 402 can be annotated with criteria for assignment of the situation definition 402 to user profiles (e.g., the user profile 408). For example, the criteria can include application domain, business area, departments, groups of users, list of individual users, and/or role of the user. In some examples, the definition module 308 identifies user profiles (e.g., that are associated with the system 300) that are associated with criteria that corresponds (or matches) criteria that is associated with the situation definition 402 for assignment of the situation definition 402 to the appropriate user profiles (e.g., the user profile 408). In some examples, the situation definition 402 is associated with a plurality of user profiles.

In some examples, generating the situation definition 402 includes determining a relevance level associated with the situation definition 402. Specifically, the relevance level indicates a timing associated with a notification of situation instances based on a situation definition 402, e.g., to one or more users associated with the situation definition 402. That is, a higher level of relevance of a situation instance based on the situation definition 402 indicates a more immediate notification of the situation instance based on the situation definition 402 to the user. In some examples, the relevance level is dynamic and the definition module 308 calculates the relevance level continuously (or at predetermined time intervals). In some examples, the definition module associates a predetermined relevance level with a situation instance based on the situation definition 402 (e.g., as indicated by user input). In some examples, the relevance level for a situation instance based on the situation definition 402 can be based on the user profile of the user.

In some examples, generating the situation definition 402 includes updating a previously-generated situation definition. In some examples, the definition module 308 updates the previously-generated situation definition to generate the situation definition 402. Updating the previously-generated situation definition can include updating one or more portions of the previously-generated situation definition, including the trigger condition 410, the related information 412, and/or the actions 414.

Figure 5:
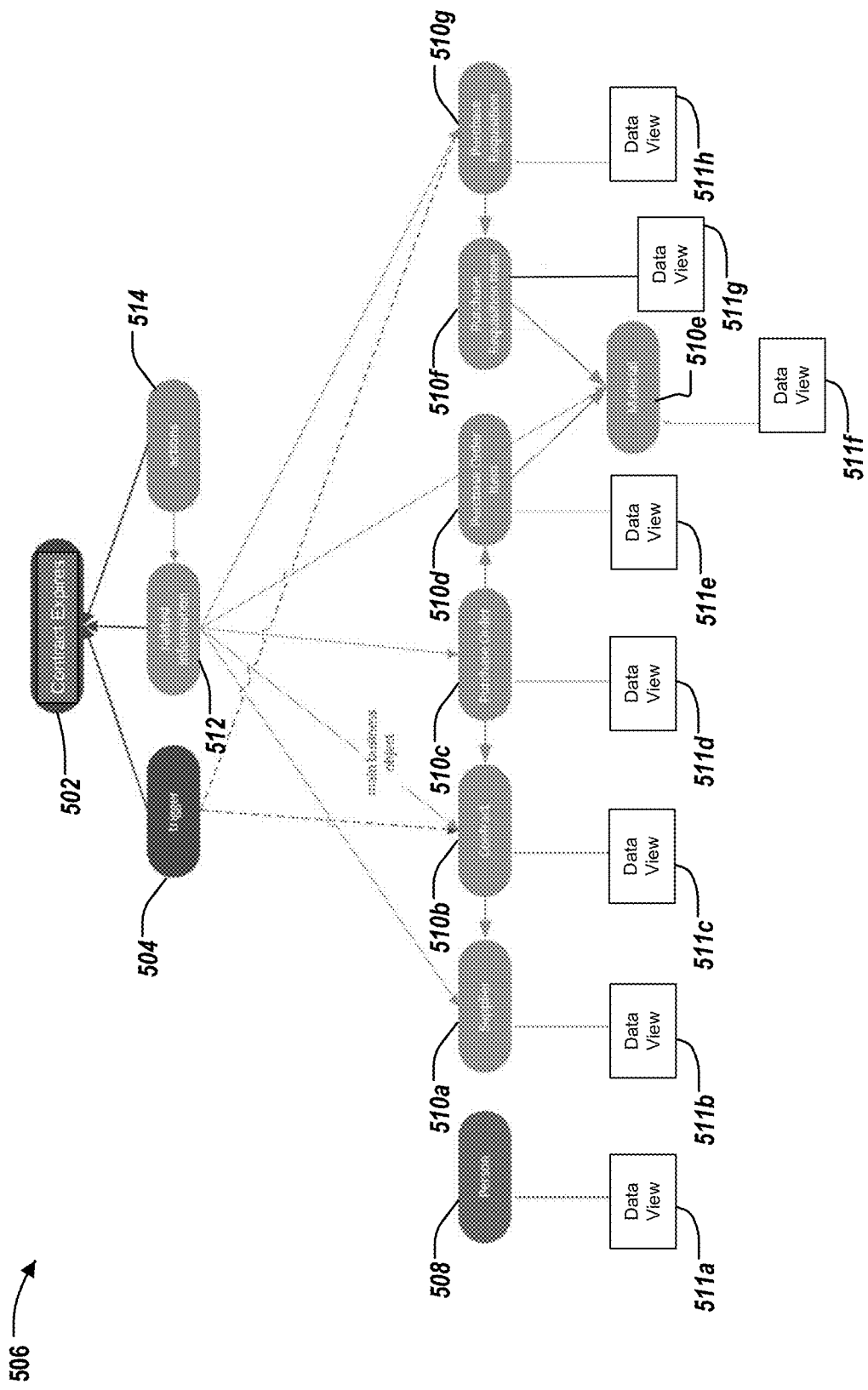
FIG. 5 illustrates an example of handling of a situation definition, according to an implementation.

FIG. 5 illustrates an example of handling of a situation definition 502, according to an implementation. Specifically, in some implementations, a trigger condition 504 is identified of a knowledge graph 506 that is associated with a user profile 508. In some examples, the trigger evaluation module 310 identifies the trigger condition 504. In the illustrated example, the trigger condition 504 is identified based on the user providing log-in credentials (e.g., to the system 300) to access the associated user profile 508. In the illustrated example, the knowledge graph 506 includes business objects 510a, 510b, 510c, 510d, 510e, 510f, 510g (collectively referred to as business objects 510). The business objects 510 can be similar to the business objects 210, 212, as described above. The knowledge graph 506 further includes relationships between the business objects 510, and data views 511a-511h (collectively referred to as data views 511), similar to data views 202 described above.

In some implementations, the trigger condition 504 is determined to be satisfied. In some examples, the trigger condition evaluation module 310 determines that the trigger condition 504 is satisfied. The trigger condition 504 is associated with the particular business objects 510b and 510g. Specifically, based on the business objects 510b, 510g, and in particular, the data associated with the business objects 510b, 510g (e.g., the data views 202), the trigger evaluation module 310 determines that the trigger condition 504 is satisfied.

In the illustrated example, the trigger condition 504 is associated with a contract expiration age. That is, the trigger condition evaluation module 310 can determine that the contract data (e.g., age of the contract) associated with the business object 510b satisfies the trigger condition 504 (e.g., threshold age). For example, the trigger condition 504 can be satisfied when the age of the contract will expire in 30 days (e.g., threshold age), and the contract data of the business object 510b indicates a current age of 30 days (e.g., age of the contract). Thus, the trigger condition 504 is satisfied. Additionally, the trigger condition 504 can indicate other criteria related to the business object 510b. Furthermore, in the illustrated example, the trigger condition 504 is associated with purchase requisitions. That is, the trigger condition evaluation module 310 can determine that purchase requisition data (e.g., age of a purchase request) associated with the business object 510g satisfies the trigger condition 504 (e.g., threshold age). For example, the trigger condition 504 can be satisfied when the age of the purchase requisition will expire in 30 days (e.g., threshold age), and the purchase requisition data of the business object 510b indicates a current age of 30 days (e.g., age of the purchase requisition). In some examples, the trigger condition 504 is further associated with other purchase requisition data, such as criteria indicating that a contract is not currently associated with the business object (not covered by an appropriate contract). Thus, the trigger condition 504 is satisfied. Additionally, the trigger condition 504 can indicate other criteria related to the business object 510g.

In some examples, the trigger condition evaluation module 310 identifies a predetermined evaluation frequency associated with the trigger condition 504. The evaluation frequency can indicate how often the trigger condition 504 is evaluated to determine whether the trigger condition 504 is satisfied (e.g., based on the appropriate business objects 510). The trigger condition evaluation module 310 can evaluate the trigger condition 504 based on the identified evaluation frequency, and determine that the trigger condition 504 is satisfied. In some examples, the trigger condition evaluation module 310 identifies user input indicating a request to evaluate the trigger condition 504. The trigger condition evaluation module 310 can evaluate the trigger condition 504 based on the user input, and determine that the trigger condition 504 is satisfied.

In some implementations, based on determining that the trigger condition 504 is satisfied, the situation definition 502 is identified that is associated with the trigger condition 504. In some examples, the trigger condition evaluation module 310 identifies the situation definition 502. In the illustrated, the trigger condition evaluation module 310 can identify the situation definition 502 with a textual description of "contract expires," that in some examples, is stored by the situation data store 316. In some examples, identifying the situation definition 502 can include creating an instance of the situation definition 502 that is stored by the situation data store 316.

In some implementations, based on the situation definition 502, related information 512 and actions 514 are identified. In some examples, the trigger condition evaluation module 310 identifies the related information 512 and the actions 514 that is indicated as associated with the situation definition 502 (e.g., as stored by the situation data store 316). The related information 512 and the actions 514 are associated with the business objects 510. In the illustrated example, the related information is associated with business object 510a, 510b, 510c, 510e, and 510g. In some examples, one or more of the business objects 510a, 510b, 510c, 510e, and 510g serve as business anchor points for entry to the knowledge graph 506 for identification of the related information 512 and the actions 514. In some examples, the related information 512 can include such information as related telephone data, edits to instances of the situation definition 502, and related users to the situation definition 502.

In some examples, the situation definition 502 (and/or the instance of the situation definition 502) is dynamic in that the related information 512 and the actions 514 may be updated dynamically (e.g., upon identification of the situation definition 502 or creation of the instance of the situation definition 502).

In some implementations, a graphical representation of a summary of a situation instance of the situation definition 502 is provided for display to the user, e.g., using the GUI 142. In some examples, the presentation module 312 generates the graphical representation of the summary situation instance of the situation definition 502. The summary of the situation instance of the situation definition 502 can include a graphical representation of the related information 512 and the actions 514. In some examples, the summary of the situation instance of the situation definition 502 can further include a title and a textual description of the situation definition 502.

In some implementations, a user selection of an action of the actions 514 is received. For example, upon presentation of the summary of the situation instance of the situation definition 502 to the user (including related information 512 and actions 514), the user can provide user input indicating a selection of the action (or multiple actions) of the actions 514. The selected action(s) can facilitate handling of the situation instance of the situation definition 502. In some examples, the user can provide further input associated with the selection of the appropriate action(s), e.g., textual-input describing an analysis of the selection of the appropriate action(s), or selection of a preconfigured list of responses to articulate analysis of the selection of the apriority action(s).

In some implementations, execution of the selected action(s) is enabled with respect to the particular business objects 510b and 510g. In some examples, the system 100 can enable execution of the selected actions(s).

In some examples, a criteria associated with the user profile 508 is identified and compared to the criteria of the business objects 510 to identify a subset of the business objects 510. The trigger condition evaluation module 310 evaluates the trigger(s) associated with the identified business objects 510 to determine that the trigger condition 504 is satisfied. Specifically, the user business objects 510 can be annotated with criteria for enabling that the appropriate situation instances of situation definitions (e.g., situation definition 502) is provided to the user. To that end, the criteria can include application domain, business area, departments, groups of users, list of individual users, and/or role of the user. The trigger condition evaluation module 310 can identify user profiles that are associated with criteria that corresponds (or matches) criteria that is associated with one or more of the business objects 510 for identification of the subset of the business objects 510.

In some examples, the trigger condition evaluation module 310 determines that a plurality of trigger conditions are satisfied, similar to that mentioned above with respect to trigger condition 504. The trigger condition evaluation module 310, based on such determination, can identify a plurality of situation definitions that are each associated with a respective trigger condition, similar to that mentioned above with respect to the situation definition 502. The trigger condition evaluation module 310, based on the plurality of situation definitions, can identify related information and actions associated with the business objects, similar to that mentioned above with respect to the related information 512 and the actions 514. The presentation module 312 can generate a graphical representation of the summary of each of the situation instances of the situation definitions is provided for display to the user, e.g., using the GUI 142. The summary of the situation instances of each of the situation definitions can include the graphical representation of the related information and the actions.

In some examples, a relevance of each of the plurality of situation definitions is identified. The relevance can indicate an importance of the particular situation definition with respect to the user, e.g., based on business relevance and user relevance. The ranking module 318 can rank each of the situation definitions based on the relevance of each. The presentation module 312 can generate a graphical representation of the summary of each of a subset of the ranked situation instances of the situation definitions for display to the user, e.g., using the GUI 142. In some examples, the user selects one of the ranked situation instances. For example, based on the graphical representations of the summary of each of the subset of the ranked situation instances of the situation definitions that is provided to the user, the user can select one of the ranked situation instances using user input. The representation module 312 can generate an additional graphical representation of the related information and the actions associated with the selected situation instance of the situation definition.

In some examples, the relevance can indicate a timing associated with a notification of the situation definitions 502, e.g., to the user associated with the user profile 508. That is, a higher level of relevance of the situation definitions 502 indicates a more immediate notification of the situation definitions 502 to the user. To that end, based on the relevance of the situation definitions 502, the notification module 314 prepares an alert notification and provides the alert notification for graphical display on a mobile communications device associated with the user of the user profile 508. In some examples, the alert notification can be provided for graphical display on any application user interface, such as executed by a desktop computing device, a laptop computing device, or a tablet computing device. In some examples, the alert notification is a native notification. In some implementations, the alert notification includes related information 512 and the actions 514.

In some implementations, selection of the action(s) of actions 514 by the user, as described above, can be logged, e.g., by the system 300. The logging of the selection actions 514 can be utilized for providing recommendation of actions to be associated with the situation definitions 502.

Figure 6:
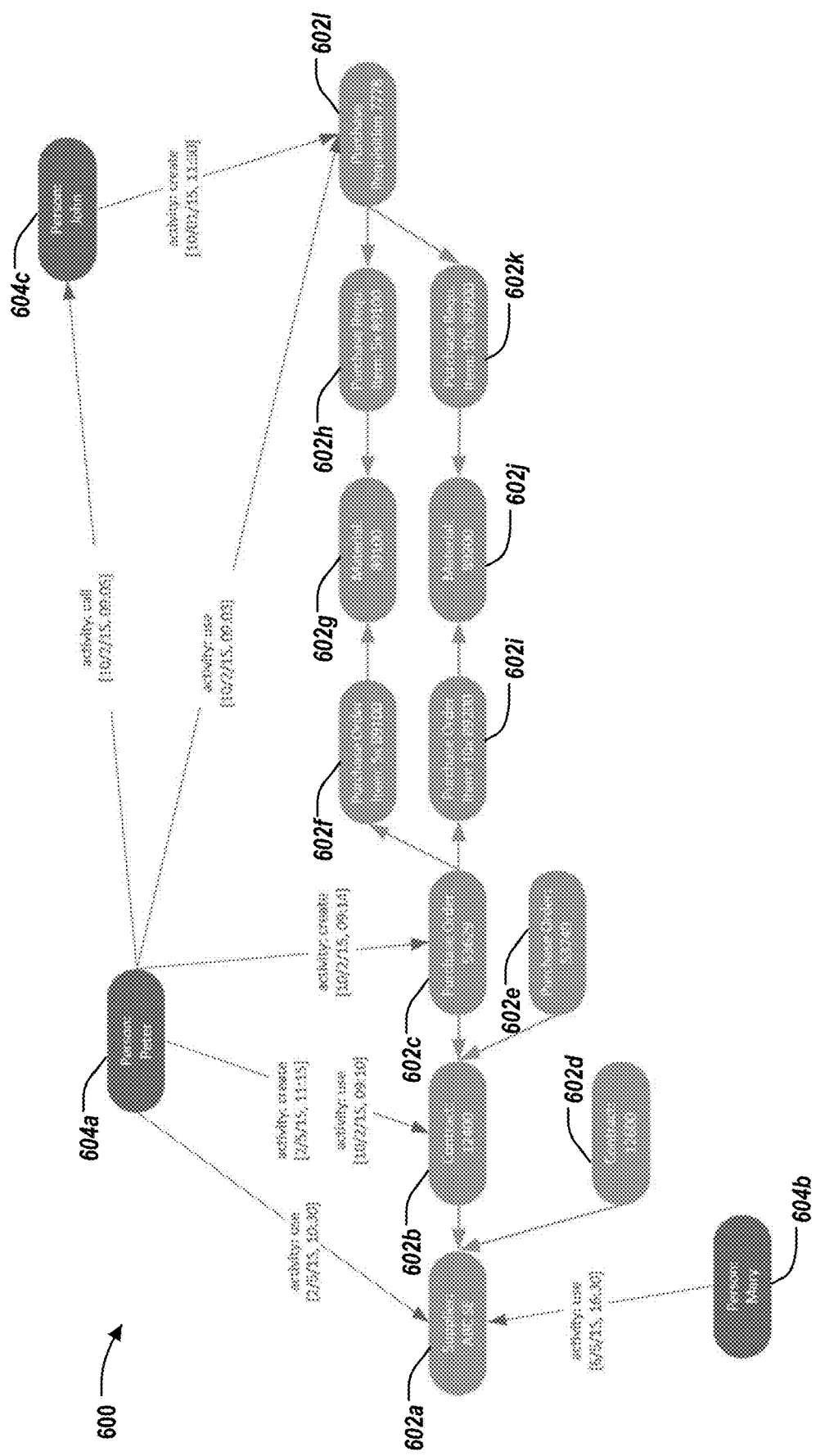
FIG. 6 illustrates a knowledge graph with activities of multiple users, according to an implementation.
Figure 7:
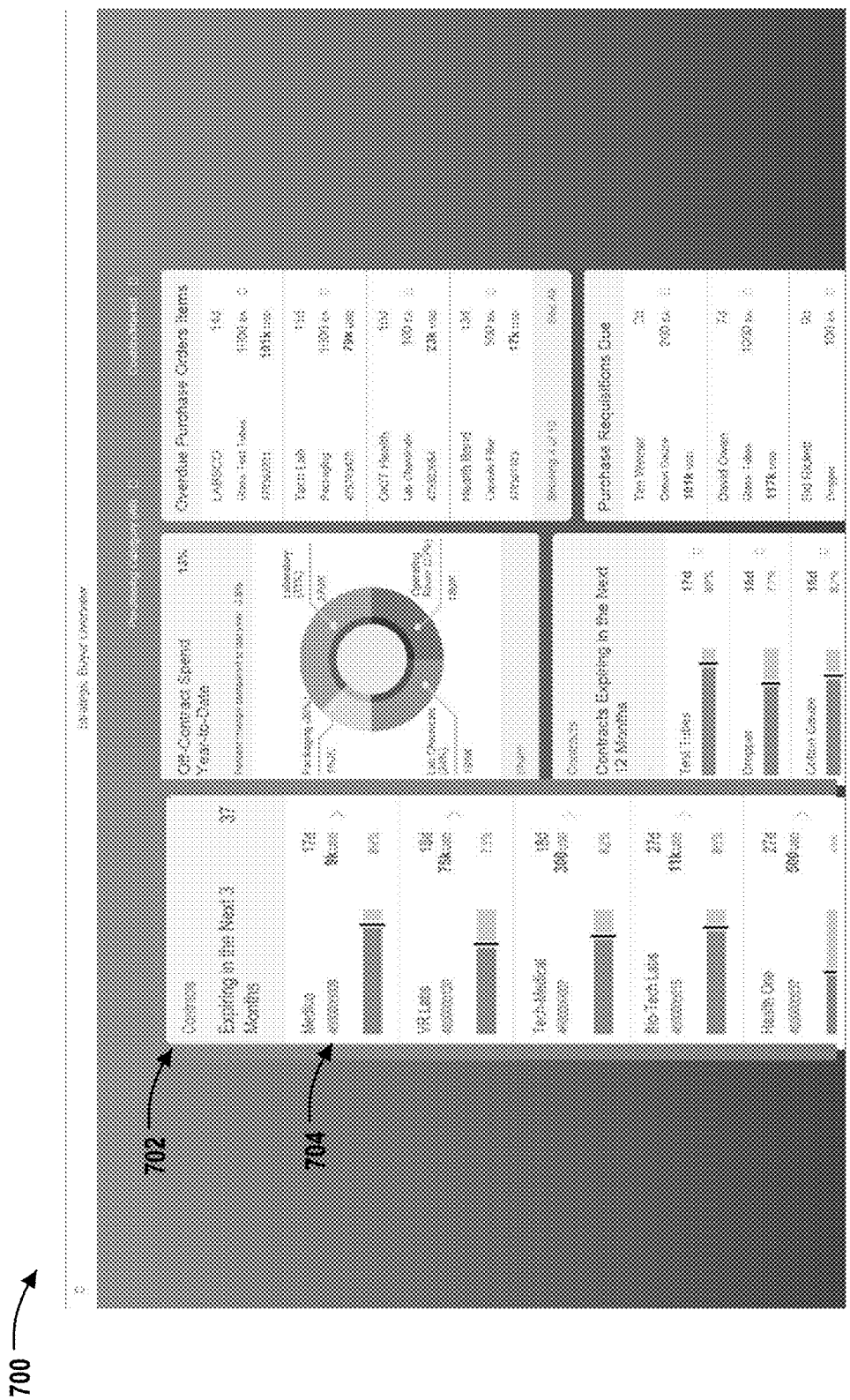
FIGS. 7-10 illustrate a graphical representation of handling of a situation instance, according to an implementation.

FIG. 6 illustrates a knowledge graph 600 including multiple users and user activities, according to an implementation. Specifically, the knowledge graph 600 includes business object instances 602*a*-6021 (collectively referred to as business object instances 602), similar to instances of business objects 210, 212, as described above. The knowledge graph 600 further includes user profile object instances 604*a*, 604*b*, 604*c* (collectively referred to as user profile object instances 604), similar to instances of the user profile object 212, as described above. To that end, the user profile object instances 604 are shown with respect to activities associated with the user profile object instance 604, and performed in relation to the business object instances 602. For example, the user profile object instance 604*a* is associated with activities that are associated with business object instances 602*a*, 602*b*, 602*c*, 6021, and further associated with an activity associated with user profile object instance 604*c*. Additionally, for example, the user profile object instance 604*b* is associated with the activities associated with the business object instance 602*a*.

FIGS. 7-10 illustrate a graphical representation of handling of a situation instance, according to an implementation. Specifically, the GUI 700 displays several modules, including module 702. Module 702 displays contracts that are associated with the user, including a first interface 704 associated with a first contract. In the illustrated example, the first interface 704 indicates that the contract is associated with an entity "Medico," and includes relevant data such as contract number, expiration date, contract cost, and consumption percentage. In some examples, the display of the contracts (e.g., the interfaces associated with the contracts) are ranked, as mentioned above.

Figure 8:
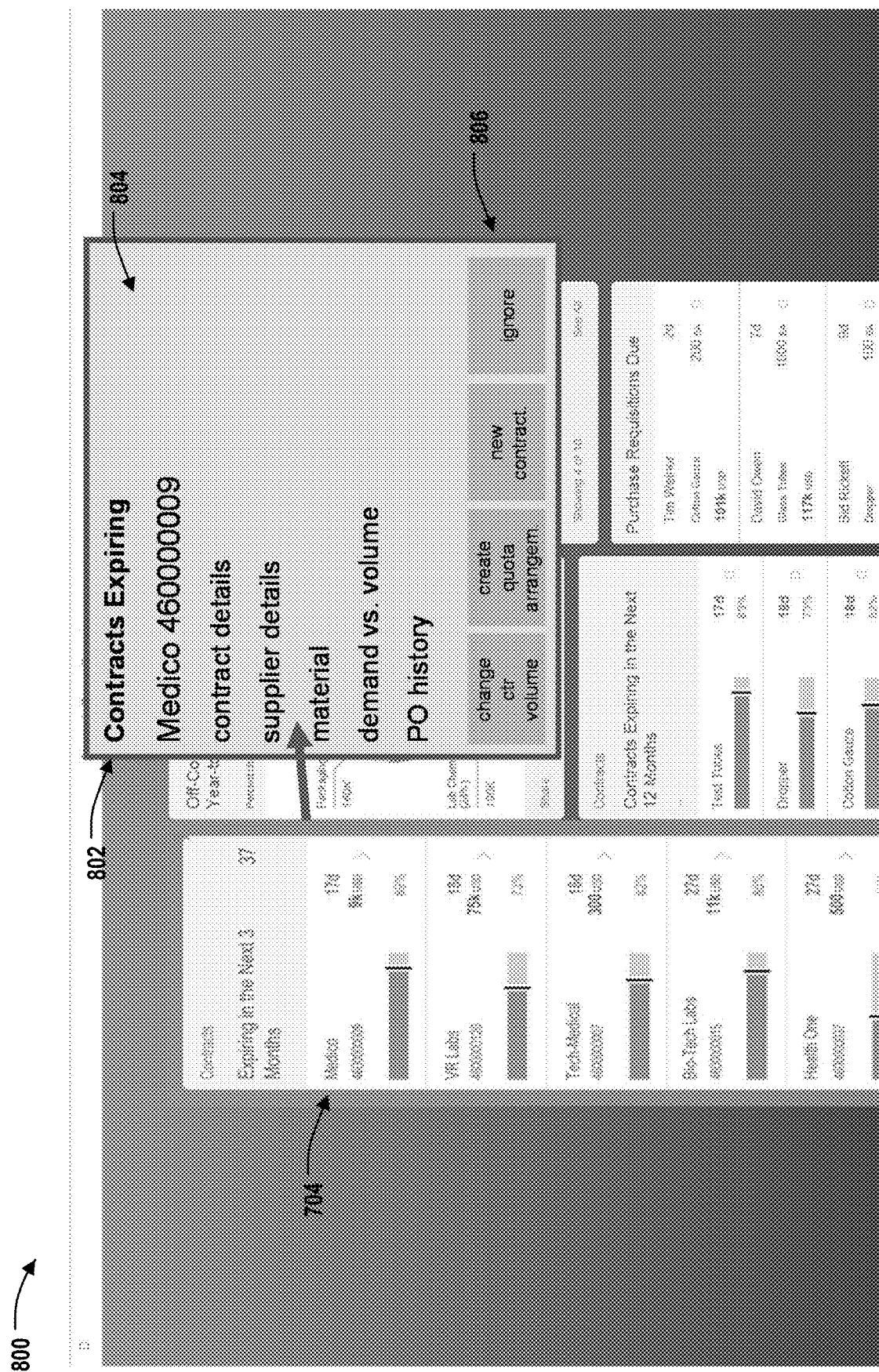

FIG. 8 illustrates a GUI 800 after selection of the first interface 704, e.g., as provided by the user, in a first example, according to an implementation. Selection of the first interface 704 can initiate identifying of a corresponding situation instance, as described above, and further identification of related information and actions associated with the situation instance, as described above. In the illustrated example, the GUI 800 includes a second interface 802 including related information 804 and actions 806. Specifically, the related information 804 includes such fields as entity name, contract number, contract details, supplier details, material, demand v. volume statistics, and purchase order history. The actions 806 can include such actions as change volume, create quota arrangement, new contract, and ignore.

Figure 9:
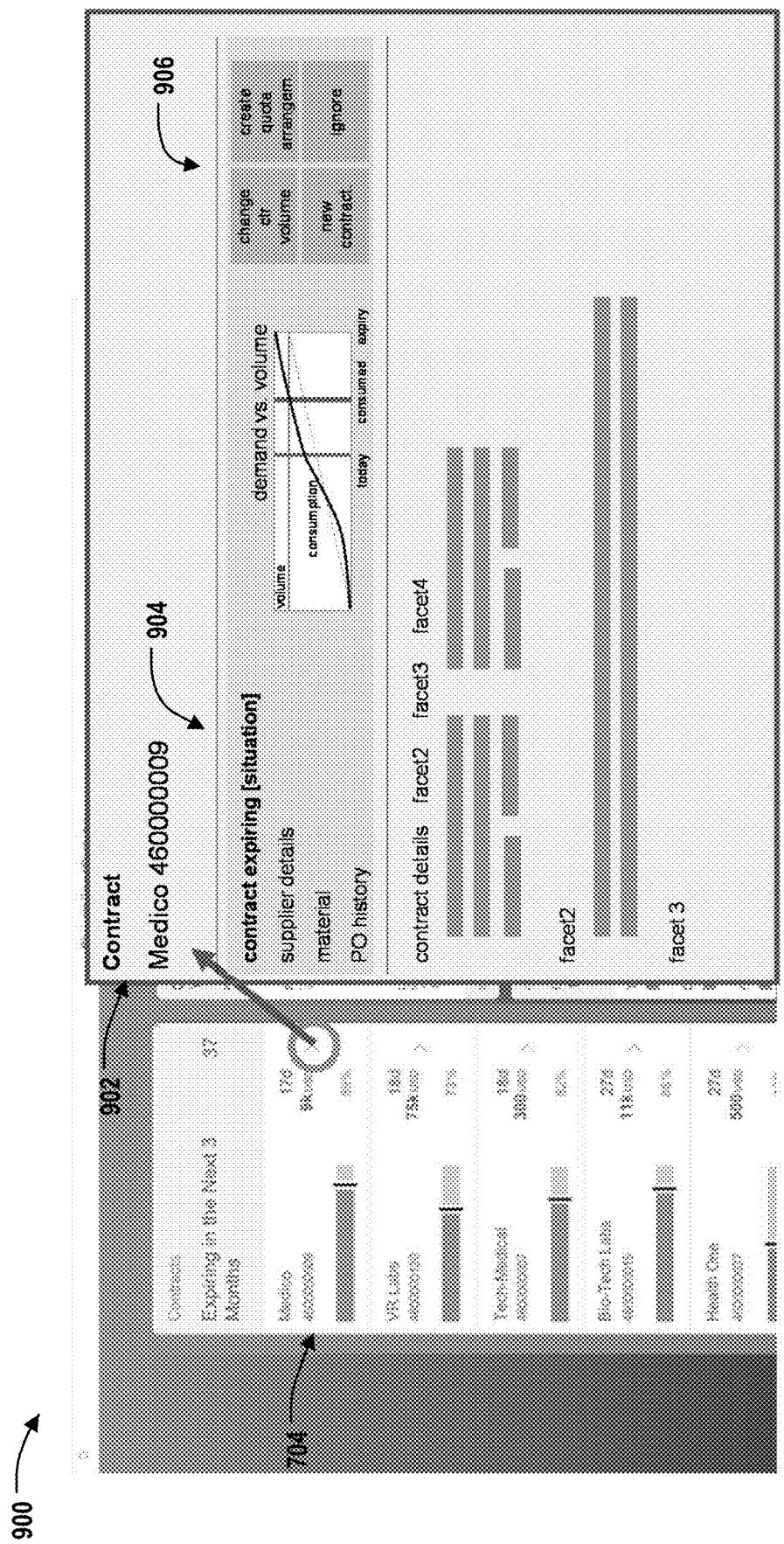

FIG. 9 illustrates a GUI 900 after selection of the first interface 704, e.g., as provided by the user, in a second example, according to an implementation. Similar to that mentioned above, selection of the first interface 704 can initiate identifying of a corresponding situation instance, as described above, and further identification of related information and actions associated with the situation instance, as described above. In the illustrated example, the GUI 900 includes a third interface 902 including related information 904 and actions 906. Specifically, the related information 904 includes such fields as entity name, contract number, contract details, supplier details, material, and purchase order history. The related information 904 can further include a graph of the demand v. volume associated with the contract, as well as further details of the contract. The actions 906 can include such actions as change volume, create quota arrangement, new contract, and ignore.

Figure 10:
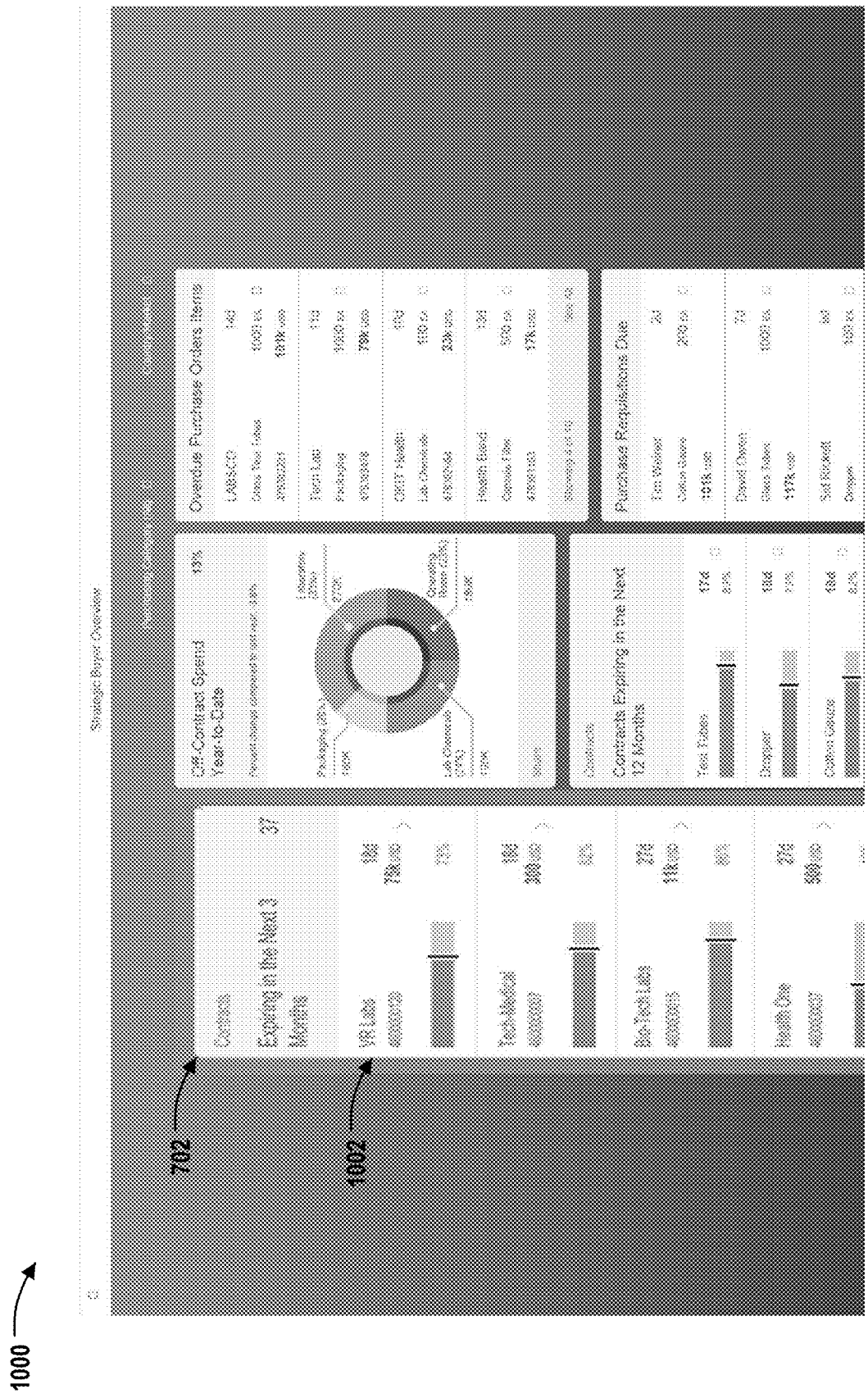

FIG. 10 illustrates a GUI 1000 after handling of the situation instance, according to an implementation. Specifically, the module 702 is updated to remove the first interface 704 based on selecting one of the actions of the situation instance associated with the first interface 704, e.g., as provided in GUI 800 or GUI 900. Thus, a different interface 1002 is now displayed as at a first position of the module 702.

Figure 11:
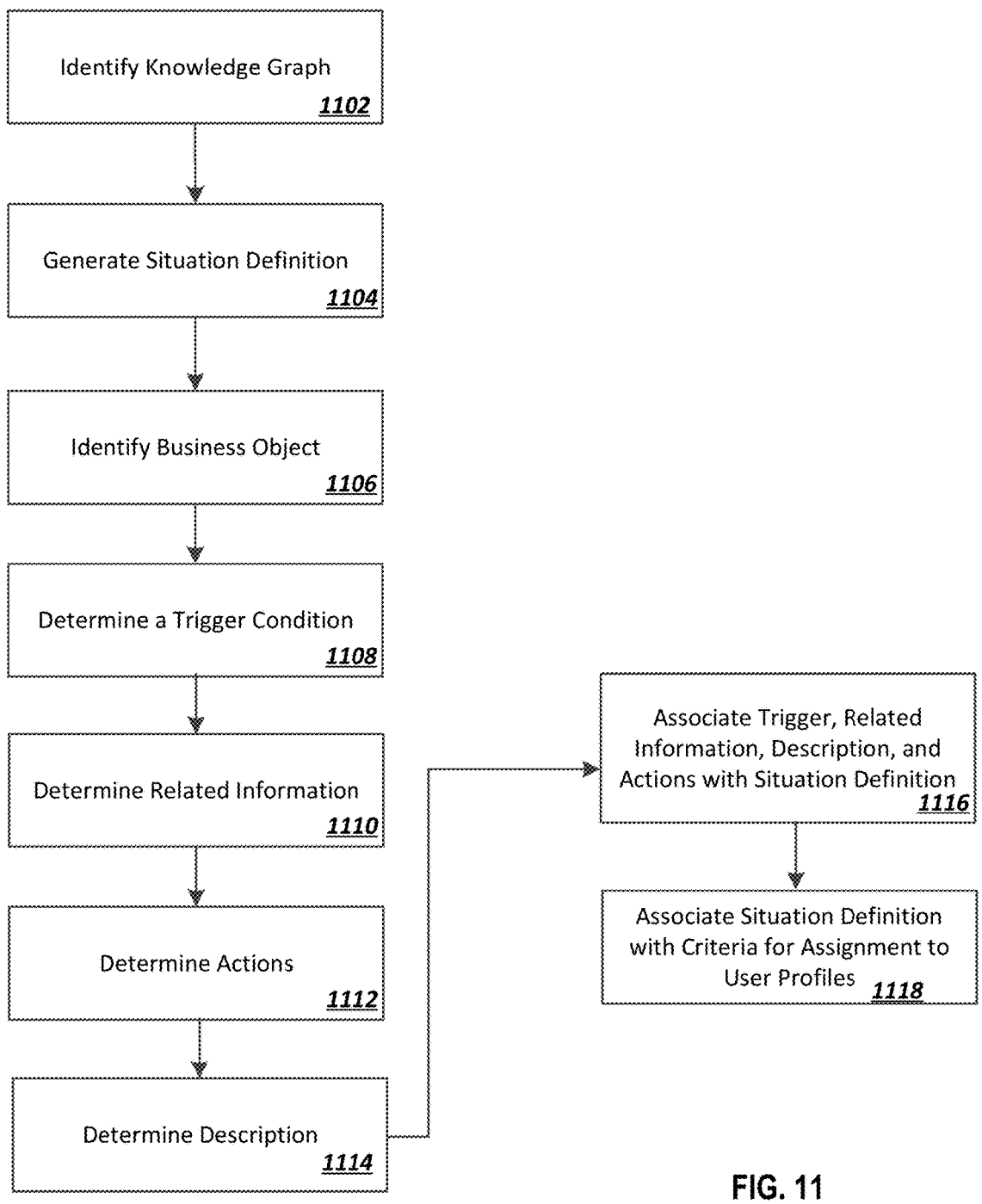
FIG. 11 illustrates a flow chart of a method for generating a situation definition, according to an implementation.

FIG. 11 illustrates a flow chart of a method 1100 for generating a situation definition, according to an implementation. For clarity of presentation, the description that follows generally describes method 1100 in the context of FIGS. 3 and 4. For example, as illustrated, particular steps of the method 1100 may be performed on or at an enterprise system, cloud-based system, and/or on-demand system, while other particular steps may be performed on or at a client system or on-premise system. However, method 1100 may be performed, for example, by any other suitable system, environment, software, and hardware, or a combination of systems, environments, software, and hardware as appropriate.

At step 1102, a knowledge graph is identified that includes one or more business objects. At step 1104, a situation definition is generated based on the knowledge graph. At step 1106, generating the situation definition includes identifying a particular business object out of one or more business objects. At step 1108, generating the situation definition includes determining a trigger condition associated with the particular business object. At step 1110, generating the situation definition includes determining related information based on the one or more business objects. At step 1112, generating the situation definition includes determining one or more actions associated with the one or more business objects. In some examples, the one or more actions associated with the one or more business objects is based on i) the trigger condition and ii) the related information. At step 1114, generating the situation definition includes determining a description (e.g., textual) associated with the one or more business objects. At step 1116, generating the situation definition includes associating the trigger condition, the related information, the description (e.g., textual), and the one or more actions with the situation definition. At step 1118, the situation definition is associated with criteria for the assignment to one or more user profiles.

Figure 12:
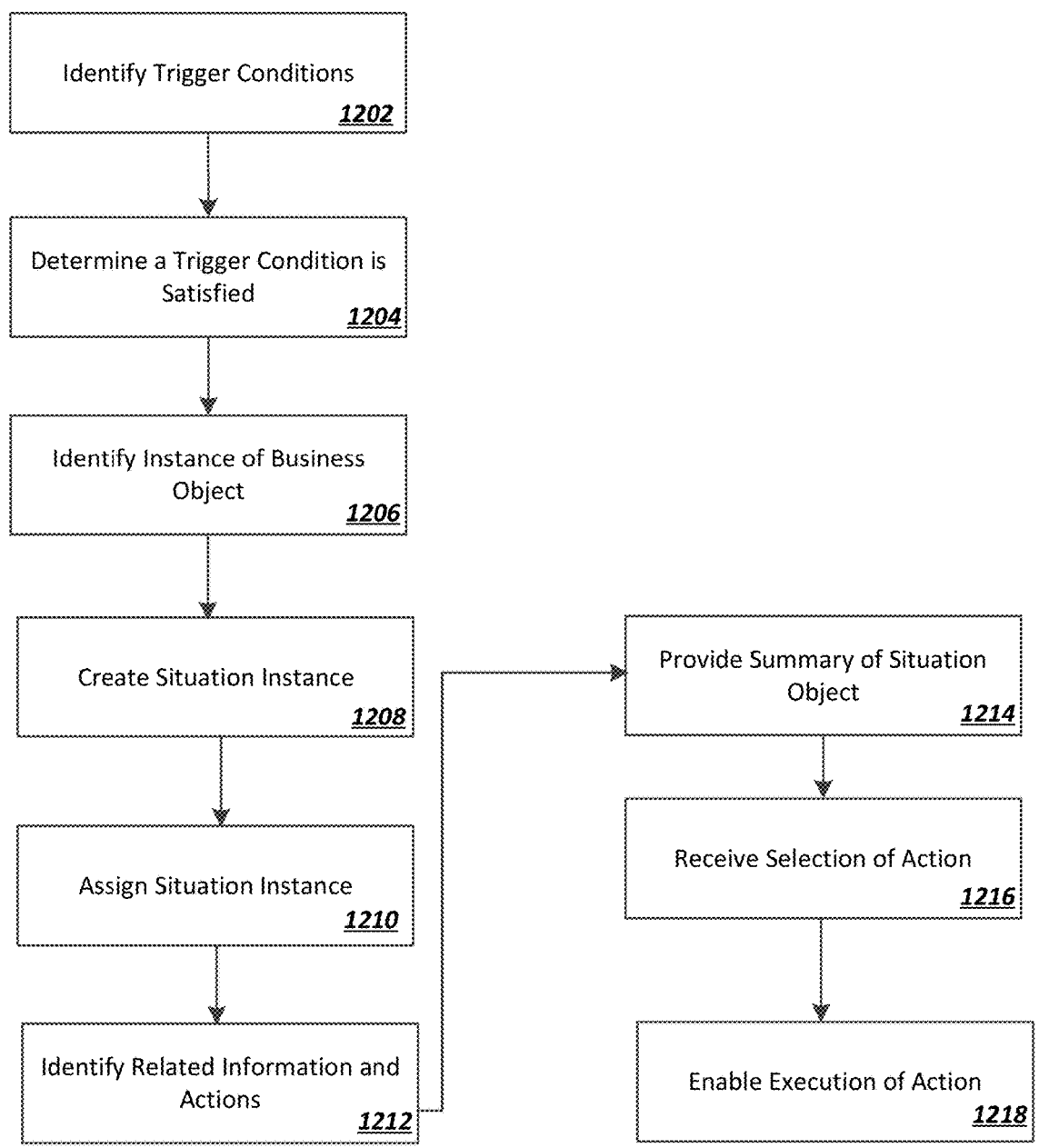
FIG. 12 illustrates a flow chart of a method for handling a situation instance, according to an implementation.

FIG. 12 illustrates a flow chart of a method 1200 for handling a situation instance. For clarity of presentation, the description that follows generally describes method 1200 in the context of FIGS. 3 and 5. For example, as illustrated, particular steps of the method 1200 may be performed on or at an enterprise system, cloud-based system, and/or on-demand system, while other particular steps may be performed on or at a client system or on-premise system. However, method 1200 may be performed, for example, by any other suitable system, environment, software, and hardware, or a combination of systems, environments, software, and hardware as appropriate.

A step 1202, one or more trigger conditions of one or more situation definitions related to a knowledge graph are identified. In some examples, the knowledge graph includes one or more business objects. At step 1204, a particular trigger condition of the one or more trigger conditions is determined as satisfied. In some examples, the particular trigger condition is associated with a particular business object of the one or more business objects. At step 1206, based on the determination, an instance of a business object of the knowledge graph is identified that is associated with the particular trigger condition. In some examples, step 1206 is optional. At step 1208, based on the business object instance and a corresponding situation definition, a situation instance is created with reference to the corresponding situation definition and the business object instance. At step 1210, the situation instance is assigned to one or more user profiles. At step 1212, based on the situation instance and the situation definition, related information and one or more actions associated with the one or more business objects are identified. At step 1214, a graphical representation of a summary of the situation instance is provided for display including the related information and the one or more actions. At step 1216, a selection of at least one action of the one or more actions is received. At step 1218, execution of the selected action is enabled, in some examples, with respect to the particular business object.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, smart watch, wearable computing device, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (Organic Light Emitting Diode), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order (e.g., FIGS. 4-9), this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. A computer-implemented method, comprising:
   identifying a knowledge graph, wherein the knowledge graph includes one or more objects, including a user profile object, and relationships between the one or more objects that are stored in a database;
   generating a situation definition that is associated with the knowledge graph, wherein the situation definition includes a trigger condition, related information, and one or more actions, and wherein the generating includes, for the one or more objects:
      identifying a particular object of the one or more objects;
      determining a particular trigger condition associated with the particular object;
      determining particular related information based on the one or more objects;
      determining one or more particular actions associated with the one or more objects and based on:
         i) the particular trigger condition, and
         ii) the particular related information;
      associating the particular trigger condition, the particular related information, and the one or more particular actions with the trigger condition, the related information, and the one or more actions, respectively, of the situation definition;
   associating the situation definition to one or more user profiles using user-associated user-profile assignment criteria, wherein the one or more user profiles are based on the user profile object of the knowledge base;
   identifying whether each object of the one or more objects satisfies the trigger condition of the service definition;
   for each object of the one or more objects satisfying the trigger condition of the service definition, generating and storing a situation instance in a database situation data store, wherein the situation instance refers to the situation definition and a particular object of the one or more objects; and
   removing from the database, or marking as deleted from the database, one or more particular objects of the one or more objects if the trigger condition of the service definition is not satisfied by the one or more particular objects.

2. The method of claim 1, wherein generating the situation definition further comprises determining a relevance level associated with the situation definition, the relevance level indicating a timing associated with a notification of the situation definition to a user associated with one of the user profiles.

3. The method of claim 1, wherein determining the particular related information further comprises selecting at least one object of the one or more objects, and determining the particular related information based on the selected at least one object.

4. The method of claim 1, wherein determining the one or more particular actions further comprises:
   identifying one or more annotations associated with the one or more objects;
   based on the identified annotations, identifying a plurality of actions associated with each object of the one or more objects; and
   selecting a subset of the plurality of actions as the determined one or more particular actions.

5. The method of claim 4, wherein selecting the subset of the plurality of actions further comprises receiving a user input indicating the subset of the plurality of actions.

6. The method of claim 1, wherein determining the particular trigger condition further comprises determining a frequency of evaluation of the particular trigger condition.

7. The method of claim 1, wherein generating the situation definition further comprises updating a previously-generated situation definition.

8. The method of claim 1, wherein generating the situation definition further comprises determining one or more criteria for assignment of the situation definition to the one or more user profiles.

9. A non-transitory computer-readable storage medium, comprising one or more instructions executable by one or more processors to perform operations comprising:
   identifying a knowledge graph, wherein the knowledge graph includes one or more objects, including a user profile object, and relationships between the one or more objects that are stored in a database;
   generating a situation definition that is associated with the knowledge graph, wherein the situation definition includes a trigger condition, related information, and one or more actions, and wherein the generating includes, for the one or more objects:
      identifying a particular object of the one or more objects;
      determining a particular trigger condition associated with the particular object;
      determining particular related information based on the one or more objects;
      determining one or more particular actions associated with the one or more objects and based on:
         i) the particular trigger condition, and
         ii) the particular related information;
      associating the particular trigger condition, the particular related information, and the one or more particular actions with the trigger condition, the related information, and the one or more actions, respectively, of the situation definition;
   associating the situation definition to one or more user profiles using user-associated user-profile assignment criteria, wherein the one or more user profiles are based on the user profile object of the knowledge base;
   identifying whether each object of the one or more objects satisfies the trigger condition of the service definition;
   for each object of the one or more objects satisfying the trigger condition of the service definition, generating and storing a situation instance in a database situation data store, wherein the situation instance refers to the situation definition and a particular object of the one or more objects; and
removing from the database, or marking as deleted from the database, one or more particular objects of the one or more objects if the trigger condition of the service definition is not satisfied by the one or more particular objects.

10. The non-transitory computer-readable storage medium of claim 9, wherein generating the situation definition further comprises determining a relevance level associated with the situation definition, the relevance level indicating a timing associated with a notification of the situation definition to a user associated with one of the user profiles.

11. The non-transitory computer-readable storage medium of claim 9, wherein determining the particular related information further comprises selecting at least one object of the one or more objects, and determining the particular related information based on the selected at least one object.

12. The non-transitory computer-readable storage medium of claim 9, wherein determining the one or more particular actions further comprises:
identifying one or more annotations associated with the one or more objects;
based on the identified annotations, identifying a plurality of actions associated with each object of the one or more objects; and
selecting a subset of the plurality of actions as the determined one or more particular actions.

13. The non-transitory computer-readable storage medium of claim 12, wherein selecting the subset of the plurality of actions further comprises receiving a user input indicating the subset of the plurality of actions.

14. The non-transitory computer-readable storage medium of claim 9, wherein determining the particular trigger condition further comprises determining a frequency of evaluation of the particular trigger condition.

15. The non-transitory computer-readable storage medium of claim 9, wherein generating the situation definition further comprises updating a previously-generated situation definition.

16. The non-transitory computer-readable storage medium of claim 9, wherein generating the situation definition further comprises determining one or more criteria for assignment of the situation definition to the one or more user profiles.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
identifying a knowledge graph, wherein the knowledge graph includes one or more objects, including a user profile object, and relationships between the one or more objects that are stored in a database;
generating a situation definition that is associated with the knowledge graph, wherein the situation definition includes a trigger condition, related information, and one or more actions, and wherein the generating includes, for the one or more objects:
identifying a particular object of the one or more objects;
determining a particular trigger condition associated with the particular object;
determining particular related information based on the one or more objects;
determining one or more particular actions associated with the one or more objects and based on:
i) the particular trigger condition, and
ii) the particular related information;
associating the particular trigger condition, the particular related information, and the one or more particular actions with the trigger condition, the related information, and the one or more actions, respectively, of the situation definition;
associating the situation definition to one or more user profiles using user-associated user-profile assignment criteria, wherein the one or more user profiles are based on the user profile object of the knowledge base;
identifying whether each object of the one or more objects satisfies the trigger condition of the service definition;
for each object of the one or more objects satisfying the trigger condition of the service definition, generating and storing a situation instance in a database situation data store, wherein the situation instance refers to the situation definition and a particular object of the one or more objects; and
removing from the database, or marking as deleted from the database, one or more particular objects of the one or more objects if the trigger condition of the service definition is not satisfied by the one or more particular objects.

18. The computer-implemented system of claim 17, wherein generating the situation definition further comprises determining a relevance level associated with the situation definition, the relevance level indicating a timing associated with a notification of the situation definition to a user associated with one of the user profiles.

19. The computer-implemented system of claim 17, wherein determining the particular related information further comprises selecting at least one object of the one or more objects, and determining the particular related information based on the selected at least one object.

20. The computer-implemented system of claim 17, wherein determining the one or more particular actions further comprises:
identifying one or more annotations associated with the one or more objects;
based on the identified annotations, identifying a plurality of actions associated with each object of the one or more objects; and
selecting a subset of the plurality of actions as the determined one or more particular actions.

* * * * *